US006979092B2

(12) United States Patent
Liang

(10) Patent No.: US 6,979,092 B2
(45) Date of Patent: Dec. 27, 2005

(54) ADJUSTABLE ACCESSORY MIRROR FOR VEHICLES

(76) Inventor: Ching-Shan Liang, No. 159, Wai Zhong St., Wai Zhong Chun, Fu Xing Shiang, Changhua Hsien (TW)

( * ) Notice: Subject to any disclaimer, the term of this patent is extended or adjusted under 35 U.S.C. 154(b) by 67 days.

(21) Appl. No.: 10/815,739

(22) Filed: Apr. 2, 2004

(65) Prior Publication Data

US 2005/0219723 A1    Oct. 6, 2005

(51) Int. Cl.[7] .............................................. G02B 7/182
(52) U.S. Cl. ...................... 359/876; 248/467; 248/481
(58) Field of Search ............................... 359/850, 864, 359/865, 876, 872; 248/467, 481

(56) References Cited

U.S. PATENT DOCUMENTS

| | | | | |
|---|---|---|---|---|
| 4,932,769 A | * | 6/1990 | Goosen ...................... | 359/865 |
| 4,941,638 A | * | 7/1990 | DiSalvatore ............... | 248/481 |
| 5,044,739 A | * | 9/1991 | do Espirito Santo ....... | 359/864 |
| 5,432,643 A | * | 7/1995 | Huang ........................ | 359/864 |

* cited by examiner

Primary Examiner—Mark A. Robinson
(74) Attorney, Agent, or Firm—Troxell Law Office, PLLC

(57) ABSTRACT

An adjustable accessory mirror for vehicles includes a fastening base, a double-sided adhesive fabric, an adjustable mirror bracket, and an accessory convex mirror wherein the fastening base mount, annular in shape, is provided with a round retaining cavity defining the top surface thereof and an engaging ball protruding at the center of the retaining cavity thereon, and the adjustable mirror bracket, disk-like, has a mirror groove concaved at the top side thereon for the accessory convex mirror to be mounted therein and a spherical ball chamber defined by elastic arc plates protruding at the bottom thereon. Via resilient support of the elastic arc plates thereof, the engaging ball of the fastening base is adapted to the spherical ball chamber of the adjustable mirror bracket in abutting location by the elastic arc plates thereof. Thus, via proper force applied onto the adjustable mirror bracket, the accessory convex mirror is tilted into a slope within a regulated height and rotated into a certain angle without the limitation of stages, facilitating a resistance to wear as well as an easy operation of the present invention. Besides, the adjustable mirror bracket is steplessly tilted and rotated to accurately shift the angle of the accessory convex mirror, providing the best rearview for a driver.

1 Claim, 4 Drawing Sheets

ADJUSTABLE ACCESSORY MIRROR FOR VEHICLES

BACKGROUND OF THE INVENTION

The present invention is related to an adjustable accessory mirror for vehicles, including a fastening base, a double-sided adhesive fabric, an adjustable mirror bracket, and an accessory convex mirror wherein the fastening base is provided with a round retaining cavity defining the top surface thereof and an engaging ball protruding at the center of the retaining cavity thereon, and the adjustable mirror bracket has a mirror groove concaved at the top side thereon for the accessory convex mirror to be mounted therein and a spherical ball chamber defined by elastic arc plates disposed at the bottom thereon. The adjustable mirror bracket is mounted onto the fastening base via the engaging ball thereof adapted to the spherical ball chamber therein and stably retained in place via the elastic arc plates abutting against the engaging ball thereof; whereby, the adjustable mirror bracket is capable of being steplessly tilted within a certain height and rotated without the limit of stages to adjust the angle of the accessory convex mirror with ease and accuracy, achieving resistance to wear and providing the best rearview to meet the requirement of a driver.

Please refer to FIG. 5. A conventional adjustable accessory mirror for vehicles is made up of a housing 40 with an upper slope tilted at the top surface thereon, and a convex mirror 41 mounted onto the upper slope of the housing 40 thereof. Abutting protrusions 42 are disposed at the inner periphery of the housing 40 thereof to be engaged with wavy protruded flanges 44 of an adhesive base mount 43 for minute adjustment thereby. The housing 40 is rotated to shift the angle of the convex mirror 41 therewith for the adjustment thereof.

Please refer to FIG. 6. Another conventional adjustable accessory mirror for vehicles is equipped with a rotary mirror bracket 50 having a slant retaining groove 51 disposed at the upper slope thereon for a convex mirror 52 to be mounted therein, and an elastic base plate 53 with abutting blocks 54 disposed thereon to be abutted against engaging toothed ring 56 of a locating mirror mount 55 for minute adjustment and location thereby. The rotary mirror bracket 50 is rotated to shift the angle of the convex mirror 52 therewith for the adjustment thereof.

Please refer to FIG. 7. A third conventional adjustable accessory mirror for vehicles is provided with a rotary mirror bracket 60 having a slant retaining groove 61 disposed at the upper slope thereon for a convex mirror 62 to be mounted therein, and tapered protruding teeth 64 disposed at the inner wall of a central ring 63 thereof to be abutted against engaging blocks 67 of a through rod 66 protruding at the top of a locating base mount 65 for minute adjustment thereby. The rotary mirror bracket 60 is rotated to shift the angle of the convex mirror 62 therewith for the adjustment thereof.

There are some drawbacks to the above three cases of conventional adjustable accessory mirror for vehicles (the first case is taken as an example). First, the abutting protrusions 42 of the housing 40 thereof, elastically bounced to abut against the wavy protruded flanges 44 of the adhesive base mount 43 for minute adjustment thereby, are rubbed with the wavy protruded flanges 44 thereof in a way that can easily wear off both the abutting protrusions 42 and the wavy protruded flanges 44 thereof within a short period of time and result in gaps produced there-between. Thus, the convex mirror 41 thereof tends to shake in the movement of a vehicle, easily straining and damaging the eyes of a driver. Second, the housing 40 is pivotally mounted onto the adhesive base mount 43 and adjustably rotated to shift the angles via two separate devices respectively (with an engaging hook 45 registered with a ring groove 46 and the abutting protrusions 42 matched to the wavy protruded flanges 44 thereof), which is quite complicate in structure thereof. Third, the convex mirror 41, mounted onto the slant top surface of the housing 40, is fixedly tilted into a certain slope with no other choice, and the stages of the adjustment thereof also depend on the number of the wavy protruded flanges 44 of the adhesive base mount 43, which inevitably limits the range and variety in the adjustment of angles thereof and fails to provide an accurate angle to meet the requirement of the driver.

SUMMARY OF THE PRESENT INVENTION

It is, therefore, the primary purpose of the present invention to provide an adjustable accessory mirror for vehicles, including a fastening base, a double-sided adhesive fabric, an adjustable mirror bracket, and an accessory convex mirror wherein the adjustable mirror bracket is mounted onto the fastening base via an engaging ball of the fastening base adapted to a spherical ball chamber of the adjustable mirror bracket therein and flexibly retained in place via elastic arc plates abutting against the engaging ball thereof, providing an even and arc abutting surface to efficiently reduce the frictional wear for longer using lifetime thereof and to stably locate the accessory convex mirror at the fastening base thereon for protecting the eyes of a driver.

It is, thereof, the second purpose of the present invention to provide an adjustable accessory mirror for vehicles wherein the adjustable mirror bracket is provided with a short round column made up of the spherical ball chamber disposed therein and the elastic arc plates defining both sides thereof, which is stably coupled with the fastening base thereof as well as pivotally rotated thereby to shift the angle of the accessory convex mirror, precisely simplifying the structure of the present invention as a whole for more efficient function thereof.

It is, therefore, the third purpose of the present invention to provide an adjustable accessory mirror for vehicles wherein the adjustable mirror bracket is capable of being tilted as well as rotated without the limit of stages to flexibly shift the angle of the accessory convex mirror, achieving wider range and variety of angles in adjustment thereof to provide an accurate angle for the requirement of the driver.

DETAILED DESCRIPTION OF THE PREFERRED EMBODIMENTS

Figure 1:
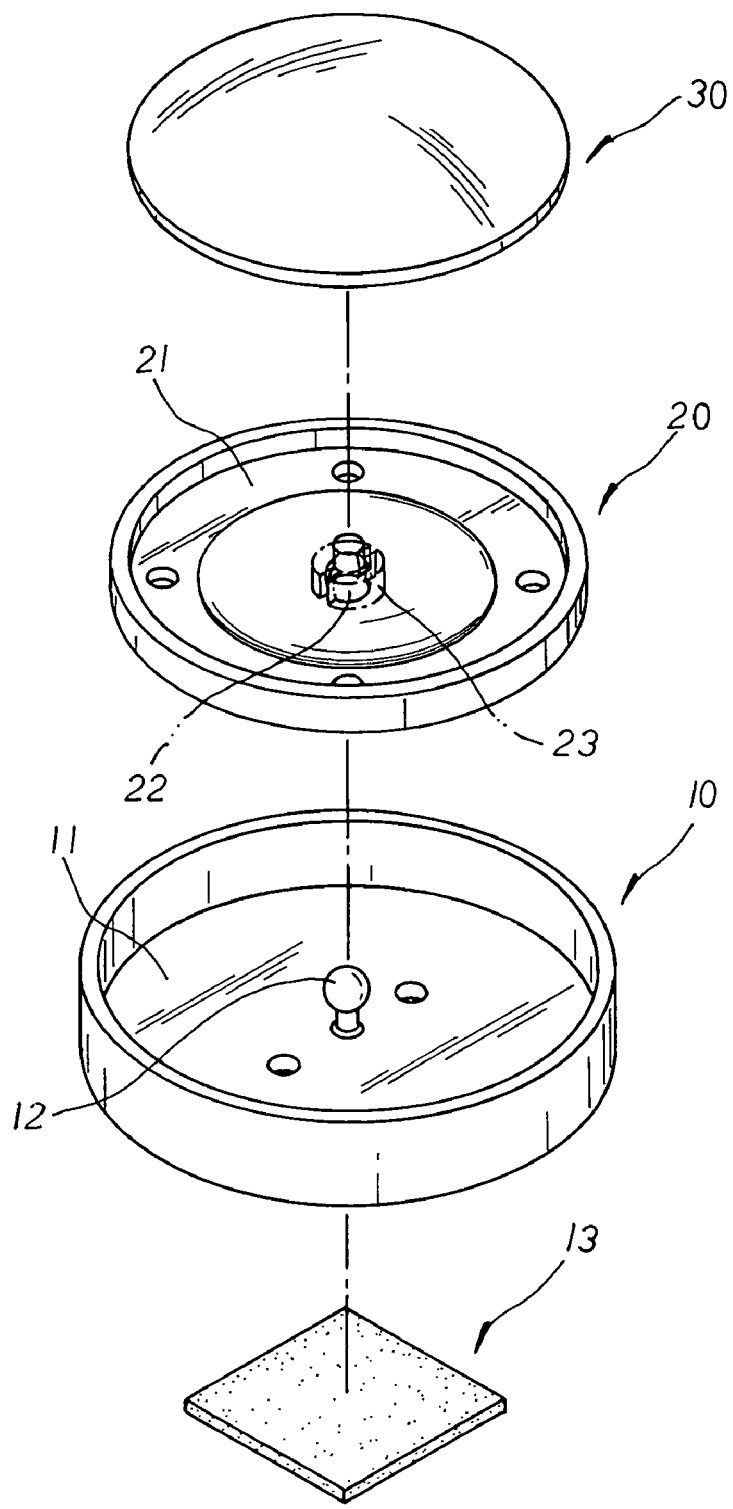
FIG. 1 is a perspective exploded view of the present invention.
Figure 7:
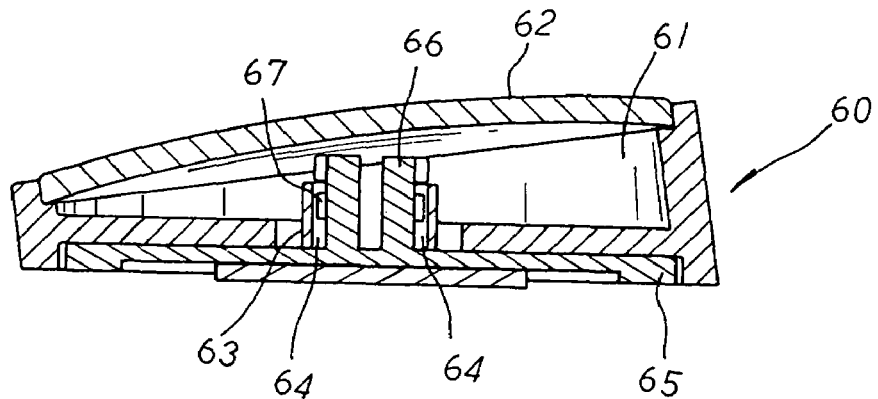
FIG. 7 is a cross sectional view of a third conventional adjustable accessory mirror structure.

Please refer to FIG. 1. The present invention is related to an adjustable accessory mirror for vehicles, including a fastening base 10, a double-sided adhesive fabric 13, an adjustable mirror bracket 20, and an accessory convex mirror 30. The fastening base 10, annular in shape, is provided with a round retaining cavity 11 defining the top surface thereof, and an engaging ball 12 protruding at the center of the retaining cavity 11 thereon. The adjustable mirror bracket 20 is disk-like, having a mirror groove 21 concaved at the top side thereon, and a short round column protruding at the bottom thereon wherein a spherical ball chamber 22 is disposed at the inner side of the round column therein and recesses are symmetrically cut at both sides of the round column thereof to form two elastic arc plates 23 defining the round column of the adjustable mirror bracket 20 thereof.

Figure 2:
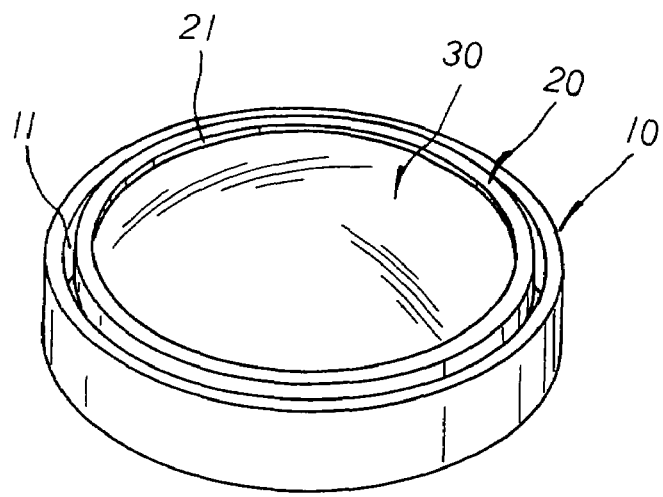
FIG. 2 is a perspective view of the present invention in assembly.

Please refer to FIG. 2. In assembly, the accessory convex mirror 30 is levelly applied and fixedly fastened to the mirror groove 21 of the adjustable mirror bracket 20 therein. Via the resilient support of the elastic arc plates 23 thereof, the engaging ball 12 of the fastening base 10 is flexibly bounced to the spherical ball chamber 22 of the adjustable mirror bracket 20 and located therein in abutment against the elastic arc plates 23 thereof. Via the abutting location of the elastic arc plates 23 thereof, the adjustable mirror bracket 20 is able to be tilted into a slope within a certain regulated range and adjusted in angles without the limitation of stages. Finally, the double-sided adhesive fabric 13 is fastened to the bottom side of the fastening base 10 to complete the assembly of the present invention that can be further applied onto a rearview mirror of a vehicle.

Figure 3:
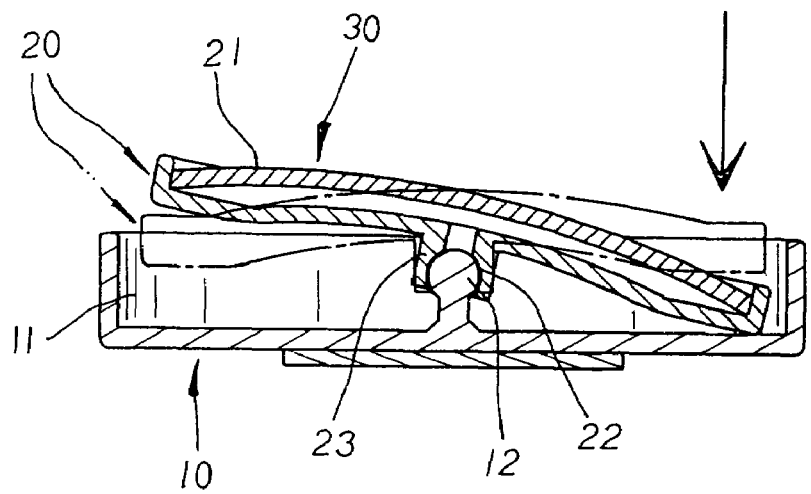
FIG. 3 is a diagram showing the present invention tilted into a slope in operation.
Figure 4:
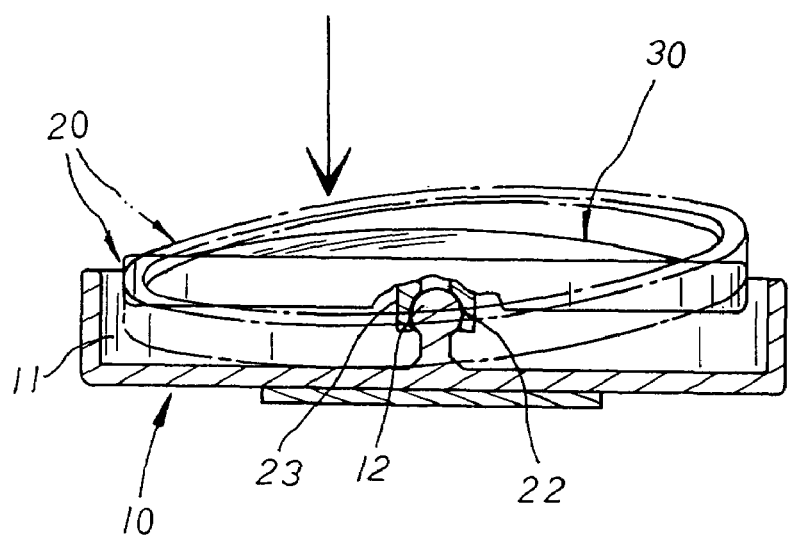
FIG. 4 is a diagram showing the present invention rotated in the adjustment of angle.
Figure 5:
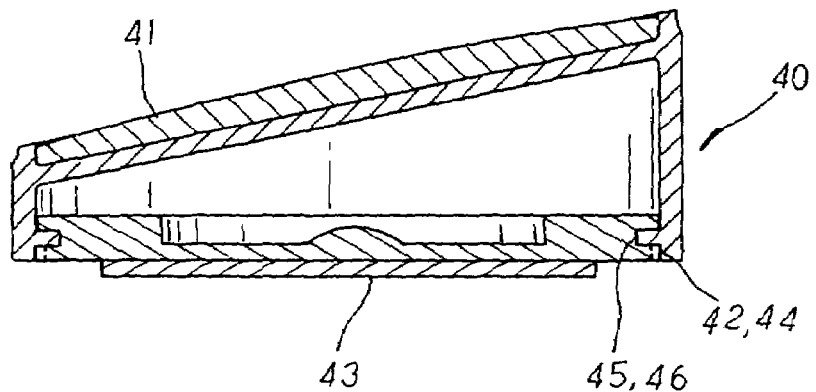
FIG. 5 is a cross sectional view of a conventional adjustable accessory mirror structure.
Figure 6:
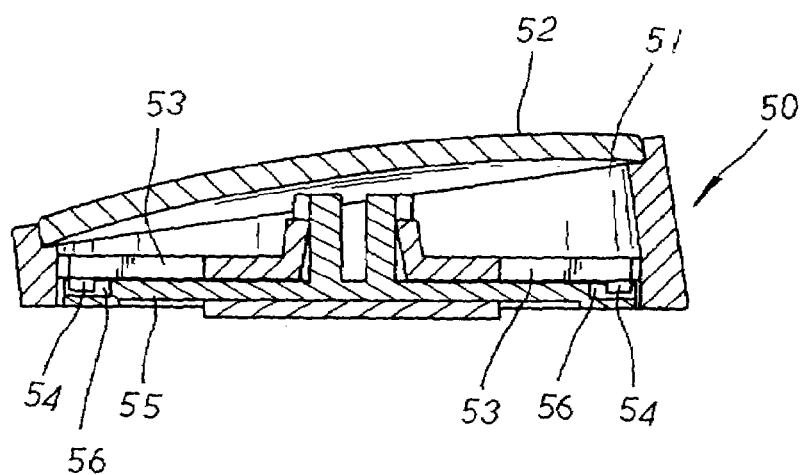
FIG. 6 is a cross sectional view of another conventional adjustable accessory mirror structure.

Please refer to FIGS. 3 to 4 inclusive. In the adjustment thereof, proper force is applied onto the adjustable mirror bracket 20 thereof to shift the angle of the accessory convex mirror 30 that can be steplessly tilted into a slope within a regulated height and rotated into a certain angle without the limitation of stages, achieving wider range and variety of angles for more precise adjustment thereof and providing an accurate angle for the requirement of a driver. Besides, the adjustable mirror bracket 20 is stably coupled with the fastening base mount 10 with the engaging ball 12 thereof located at the ball chamber 22 therein and flexibly abutted against by the elastic arc plates 23 thereof wherein the engaging ball 12 thereof is evenly contacted with the ball chamber 22 by the spherical surface as a whole, relatively reducing the friction wear thereof for longer using lifetime thereof and efficiently refraining the accessory convex mirror 30 from shaking in the movement of the vehicle to protect the eyes of the driver.

What is claimed is:

1. An adjustable accessory mirror for vehicles, including a fastening base, a double-sided adhesive fabric, an adjustable mirror bracket, and an accessory convex mirror wherein the fastening base, annular in shape, is provided with a round retaining cavity defining the top surface thereof, and the adjustable mirror bracket, disk-like, has a mirror groove concaved at the top side thereon for the accessory convex mirror to be mounted therein; the double-sided adhesive fabric is attached to the bottom side of the fastening base thereby; the present invention being characterized by that, the fastening base also includes an engaging ball protruding at the center of the retaining cavity thereon, and the adjustable mirror bracket has a short round column protruding at the bottom thereon wherein a spherical ball chamber is disposed at the inner side of the round column therein and recesses are symmetrically cut at both sides of the round column thereof to form two elastic arc plates defining the ball chamber thereof;

in assembly, via the resilient support of the elastic arc plates thereof, the engaging ball of the fastening base is adapted to the spherical ball chamber of the adjustable mirror bracket therein and located therein in abutment against the elastic arc plates thereof; thus, via proper force applied onto the adjustable mirror bracket, the accessory convex mirror is able to be tilted into a slope within a regulated height and rotated into a certain angle without the limit of stages, facilitating a resistance to wear as well as an easy operation of the present invention; besides, the adjustable mirror bracket is steplessly tilted and rotated to accurately shift the angle of the accessory convex mirror.

* * * * *